United States Patent [19]

Terashima et al.

[11] Patent Number: 5,615,368

[45] Date of Patent: Mar. 25, 1997

[54] SYSTEM HAVING TABLE STORING PLURALITY OF OPTIMAL PATROL SEEK SCHEMES FOR RESPECTIVE DISK DRIVES AND EXECUTING ASSOCIATED SCHEME BASED UPON INPUTTED DISK DEVICE NAME

[75] Inventors: Ryo Terashima; Kazunori Nakabayashi, both of Tokyo, Japan

[73] Assignee: NEC Corporation, Tokyo, Japan

[21] Appl. No.: 414,134

[22] Filed: Mar. 30, 1995

Related U.S. Application Data

[63] Continuation of Ser. No. 107,578, Aug. 18, 1993, abandoned.

[30] Foreign Application Priority Data

Aug. 18, 1992 [JP] Japan ..................................... 4-218869

[51] Int. Cl.⁶ ...................................................... G06F 13/10
[52] U.S. Cl. ........................... 395/671; 395/416; 395/800; 395/835; 360/69; 360/75; 360/77.04; 360/77.08
[58] Field of Search ............................. 360/77.04, 77.08, 360/69, 75; 395/182.05, 489, 650, 375, 416, 800, 835

[56] References Cited

U.S. PATENT DOCUMENTS

| | | | |
|---|---|---|---|
| 5,124,987 | 6/1992 | Milligan et al. | 395/182.05 |
| 5,233,486 | 8/1993 | Albert | 360/77.04 |
| 5,285,330 | 2/1994 | Masaki | 360/77.08 |
| 5,307,489 | 4/1994 | Yamazaki | 395/650 |
| 5,321,826 | 6/1994 | Ushiro | 395/489 |
| 5,341,339 | 8/1994 | Wells | 365/218 |

FOREIGN PATENT DOCUMENTS 1300479  12/1989  Japan .

*Primary Examiner*—Thomas C. Lee
*Assistant Examiner*—Po C. Huang
*Attorney, Agent, or Firm*—Sughrue, Mion, Zinn, Macpeak & Seas

[57] ABSTRACT

A data processing system having a magnetic disk apparatus that includes a patrol seek system that provides for the altering of a patrol seek method. The patrol seek system provides for the selection of a patrol seek method for executing an optimal patrol seek based on the performance characteristics of a high density magnetic disk apparatus. The patrol seek system, equipped with a plurality of high density magnetic disk apparatuses, includes a patrol seek management table for storing patrol seek information for a high density magnetic disk apparatus, a system start processing means, an optimal processing decision means for selecting and deciding the optimal patrol seek method, an input/output means for reading the patrol seek management table, analyzing requests to alter the patrol seek method, and selecting and starting a particular patrol seek process, a patrol seek stopping means, a seek processing means for executing seek processing on a plurality of high density magnetic disk apparatuses on the basis of the contents of the patrol seek management table, and a system shutdown processing means for stopping the patrol seek. The patrol seek system can also include a terminal from which a user can alter the patrol seek method. Furthermore, a patrol seek information display can be included for displaying the information stored in the patrol seek management table.

17 Claims, 16 Drawing Sheets

SYSTEM HAVING TABLE STORING PLURALITY OF OPTIMAL PATROL SEEK SCHEMES FOR RESPECTIVE DISK DRIVES AND EXECUTING ASSOCIATED SCHEME BASED UPON INPUTTED DISK DEVICE NAME

This is a continuation of application No. 08/107,578 filed Aug. 18, 1993, now abandoned.

BACKGROUND OF THE INVENTION

The present invention relates to a data processing system having a magnetic disk apparatus, and more particularly to a patrol seek system for altering the patrol seek method according to seek command. Upon input of a seek command, the patrol seek system executes the optimal patrol seek based on the performance characteristics of a given high density magnetic disk apparatus.

In a prior art system, a function to execute a patrol seek is incorporated into special firm-ware that is built into each individual high density magnetic disk apparatus.

In a conventional system, a function to execute a patrol seek is incorporated into a device driver for each high density magnetic disk apparatus, which is, separately developed for each capacity class magnetic disk, and which is used by the operating system.

Still another prior art system is disclosed in the Japanese Patent Disclosure No. 1989-300479. This prior art system consists of a plurality of magnetic disk apparatuses; a timer means for measuring a prescribed length of time; a counter means for incrementing one count at a time; a bit map means, having a plurality of bits in a one-to-one correspondence with the plurality of magnetic disk apparatuses, for setting at the bit corresponding to a magnetic disk apparatus to "0" when a host apparatus requests that magnetic disk apparatus to start an input/output (I/O) operation and updating the bit corresponding to the magnetic disk apparatus indicated by the count of the counter means at the time the timer means has measured the prescribed length of time; and a seek means for moving the magnetic head of the magnetic disk apparatus, indicated by the count, from its location over the present cylinder to a desired cylinder position when the bit of the bit map means corresponding to the count of the counter means at the time the timer means has measured the prescribed length of time is already "1" before it is updated to "1". In other words, if a magnetic disk apparatus indicated by the count is not performing an I/O operation, its magnetic head is moved from its current location to a new, desired location.

This prior art system, however, involves the several problems.

First of all, a high density magnetic disk apparatus has a much longer access time due to mechanical accessing than do other memory apparatuses such as a main storage or a cache memory.

For instance, if a patrol seek is executed on a high density magnetic disk apparatus with a high access frequency, it will result in an I/O interrupt seek and an increase in access time for the high density magnetic disk apparatus such as the magnetic head moving time (seek time) or the time of waiting for rotation, potentially causing a serious deterioration in the overall performance of the system.

Conversely, if the high density magnetic disk apparatus has only a low access frequency, the surface of the magnetic disk medium or of the magnetic head slider can be smeared with dust or grease, resulting in problems such as a head crash, which would adversely affect the durability of the magnetic disk medium and the reliability of the memory apparatus.

Regarding the method of patrol seek, two methods are conceivable: one is to accomplish a dummy seek on a cylinder position selected purely at random, and the other, is to accomplish dummy seeks on cylinder positions in a sequence from the "0" cylinder position toward the outside at a constant pitch and to sweep out dust or the like. However no demonstrative has yet been reported to determine which method is optimum.

After all, in the first mentioned conventional system, the access frequencies of individual high density magnetic disk apparatuses can not be taken into consideration ahead of time when adding the patrol seek function to the special firmware of each high density magnetic disk apparatus, there is the problem that the cost of the high density magnetic disk apparatus itself increases, making low-cost production of high density magnetic disk apparatuses impossible.

In the second mentioned conventional system, since the access frequencies of individual high density magnetic disk apparatuses are not considered in adding the patrol seek function to each operation system device driver for the high density magnetic disk apparatuses, separately developed for each capacity class, there is the problem that the operating system itself should be altered when the set value for patrol seek execution is to be varied, making it necessary to incorporate new device drivers, one prepared for each type (capacity class or variety) of newly developed high density magnetic disk apparatus, into the operating system.

The third mentioned conventional system, disclosed in the gazette referred to, does not have a configuration to let the user of the system a select and execute a different seek methods for each magnetic disk apparatus, and accordingly has the problem that the optimal seek processing cannot be accomplished according to the use of each magnetic disk apparatus.

SUMMARY OF THE INVENTION

The principal object of the invention, therefore, is to obviate the aforementioned disadvantages, and to provide a patrol seek system that can minimize the performance deterioration of the whole system and improve the durability and reliability of high density magnetic disk apparatuses. This object is accomplished by determining the optimal seek method on the basis of management information regarding the high density magnetic disk apparatuses packaged into the system and altering the seek method by a command according to the actual use by the system user.

Accordingly, there is provided a patrol seek system equipped with a plurality of high density magnetic disk apparatuses; a patrol seek management table, stored on said high density magnetic disk apparatuses, for storing patrol seek information preset for said high density magnetic disk apparatuses; a system start processing means for starting the patrol seek system in accordance with an instruction from a terminal, and executing a patrol seek command; an input/output (I/O) means for reading in said patrol seek management table, for analyzing a request, sent from said terminal, to alter the patrol seek method, and for selecting and starting a particular patrol seek process according to the result of the analysis; a patrol seek stopping means, actuated when said request to alter the patrol seek method is judged by said I/O means to be a stop request, for stopping a patrol seek on the basis of the contents of said patrol seek management table; a patrol seek starting means, actuated when said request to alter the patrol seek method is judged by said I/O means to be a start request, for starting a patrol seek on the basis of the contents of said patrol seek management table; a patrol seek optimal processing decision means for selecting and deciding the optimal seek method for any high density magnetic disk apparatus newly packaged with the other said high density magnetic disk apparatuses; a seek processing means for executing the patrol seek processing on said plurality of high density magnetic disk apparatuses on the basis of the contents of said patrol seek management table; and a system shutdown processing means for performing end processing for the system in accordance with an instruction from said terminal, and stopping said patrol seek command.

BRIEF DESCRIPTION OF THE DRAWINGS

The features and advantages of the present invention will become more apparent from the following detailed description when taken in conjunction with the accompanying drawings, wherein.

In the drawings, the same reference numerals denote respectively the same constituent elements.

DETAILED DESCRIPTION OF THE PREFERRED EMBODIMENTS

Now will be described preferred embodiments of the present invention in detail with reference to drawings.

Figure 1:
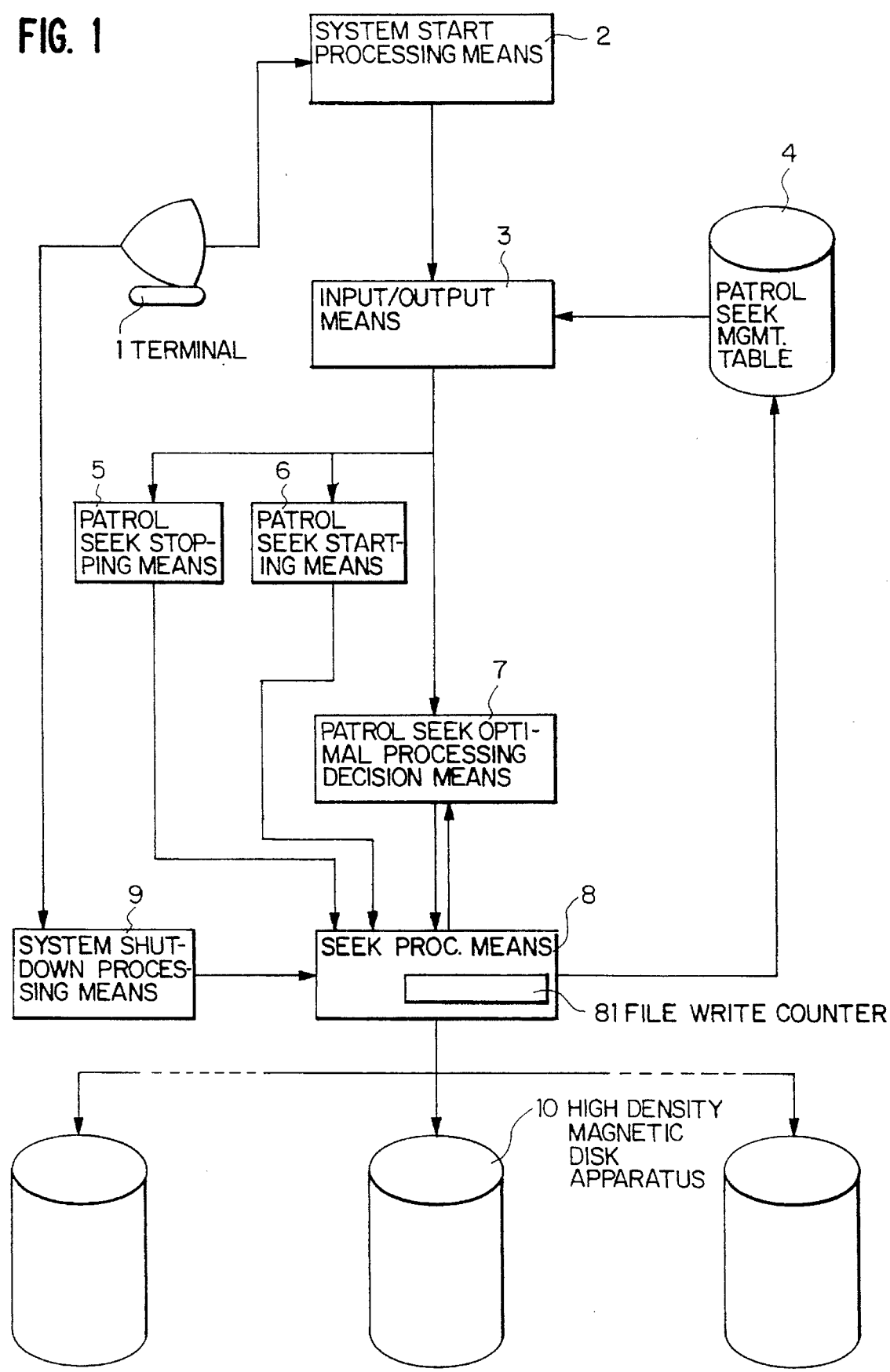
FIG. 1 is a block diagram of a first preferred embodiment of the invention.

Referring to FIG. 1, a first preferred embodiment of the invention consists of a plurality of high density magnetic disk apparatuses 10; a patrol seek management table 4 stored on some magnetic disk media of the high density magnetic disk apparatuses 10; a terminal 1 through which the system user enters commands and data from outside; system start processing means 2 for performing start processing for the system (turning on the power supply to the system) in accordance with an instruction from the terminal 1, and upon receiving and executing a patrol seek command; input/output (I/O) means 3 for reading in existing data of the patrol seek management table 4, analyzing a request, sent from the terminal 1, to alter the patrol seek method, and starting the processing according to the result of the analysis; patrol seek stopping means 5 for stopping a patrol seek, when the request to alter the patrol seek method, received from the terminal 1, is judged to be a stop request as a result of the analysis by the I/O means 3, in accordance with the request; patrol seek starting means 6 for starting a patrol seek, when the request to alter the patrol seek method is judged to be a start request as a result of the analysis by the I/O means 3, in accordance with the request; patrol seek optimal processing decision means 7 for deciding the optimal seek method for any high density magnetic disk apparatus newly packaged with the other high density magnetic disk apparatuses 10; seek processing means 8 for executing seek processing on the plurality of high density magnetic disk apparatuses 10 on the basis of the contents of the patrol seek management table; and system shutdown processing means 9 for performing end processing for the system (turning off the power supply to the system) in accordance with an instruction from the terminal 1, and stopping the processing procedure of the patrol seek command.

Figure 2:
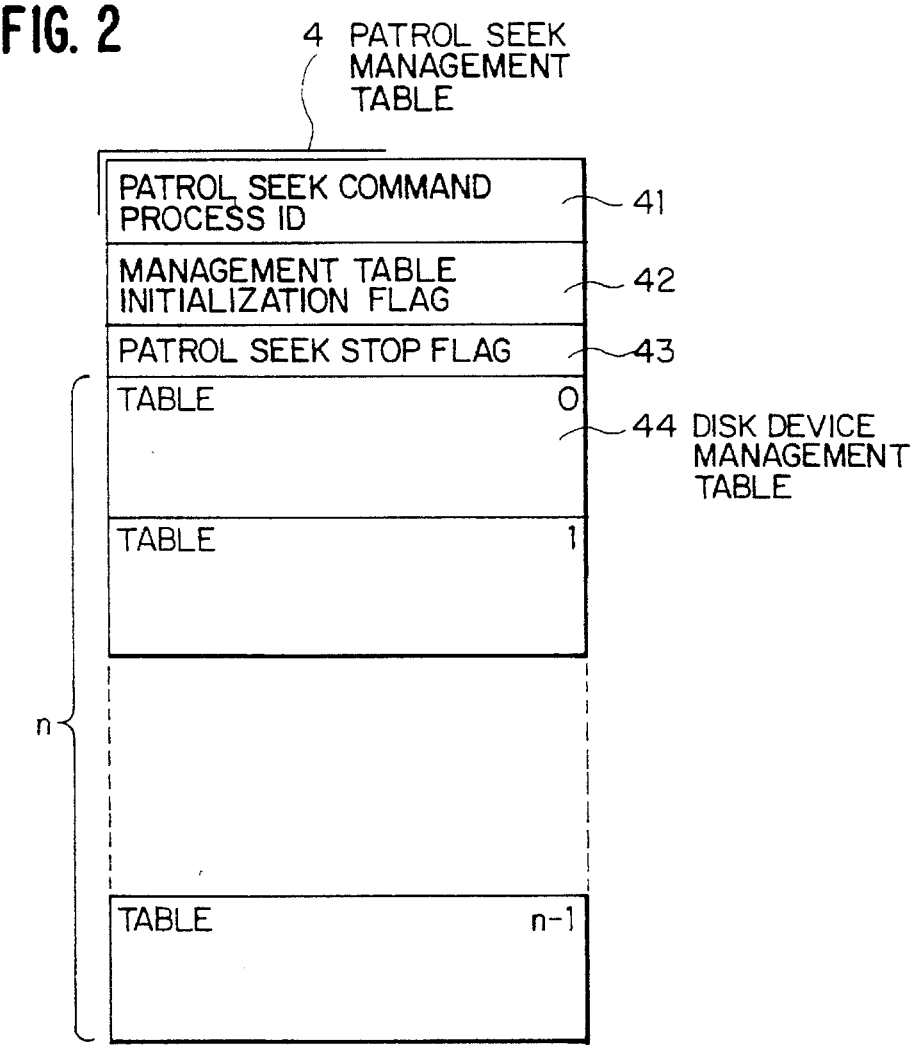
FIG. 2 is an illustrative diagram showing an example of the patrol seek management table 4 in FIG. 1.

FIG. 2 is an illustrative diagram showing an example of the patrol seek management table 4 in FIG. 1, which consists of a patrol seek command process ID 41 indicating the patrol seek command currently under execution; a management table initialization flag 42; a patrol seek stop flag 43; and disk device management tables 44, one provided for each of the disk devices packaged into one of the high density magnetic disk apparatuses 10.

When the management table initialization flag 42 is ON, the disk device management tables 44 are initialized, and when the flag 42 is OFF, the disk device management tables 44 are not initialized.

When the patrol seek stop flag 43 is ON, no patrol seek is started at the time of the next start-up of the system, and when the flag 43 is OFF, a patrol seek is started at the time of the next start-up of the system.

Figure 3:
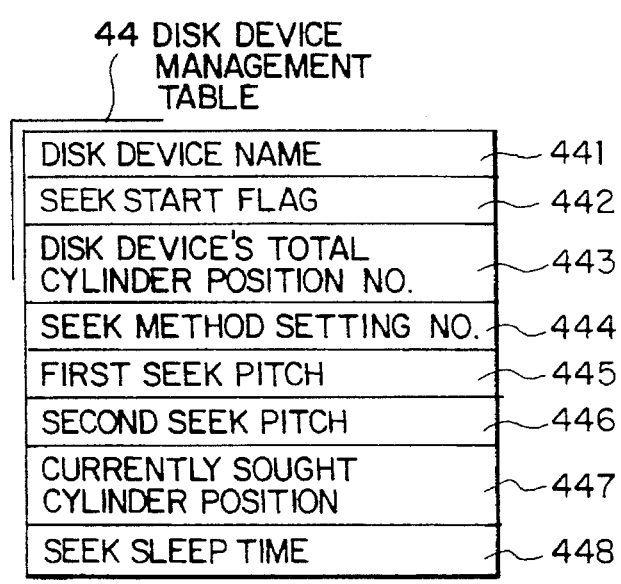
FIG. 3 is an illustrative diagram showing an example of the disk device management table 44, in FIG. 2, of the patrol seek management table 4.

FIG. 3 is an illustrative diagram showing an example of the disk device management table 44 in FIG. 2, which consists of a disk device name 441, a seek start flag 442, a disk device's total number of cylinder positions 443, a seek method setting number 444, a first seek pitch 445, a second seek pitch 446, a currently sought cylinder position 447 and the seek sleep time 448.

Next will be described the operation of the first preferred embodiment with reference of FIGS. 1 through 10.

Figure 4:
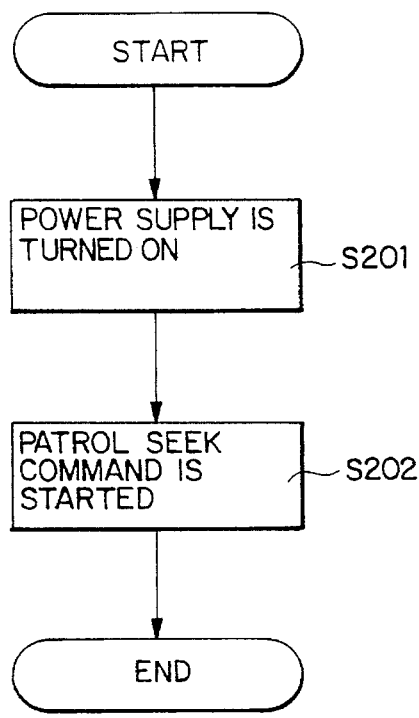
FIG. 4 is a flow chart showing the operation of the system start processing means 2 of FIG. 1.

First, in response to a system start request from the terminal 1, the power supply to the system is turned on (FIG. 4, step S201), and processing to execute a patrol seek command is started in accordance with an instruction from the terminal 1 (FIG. 4, step S202).

Figure 5:
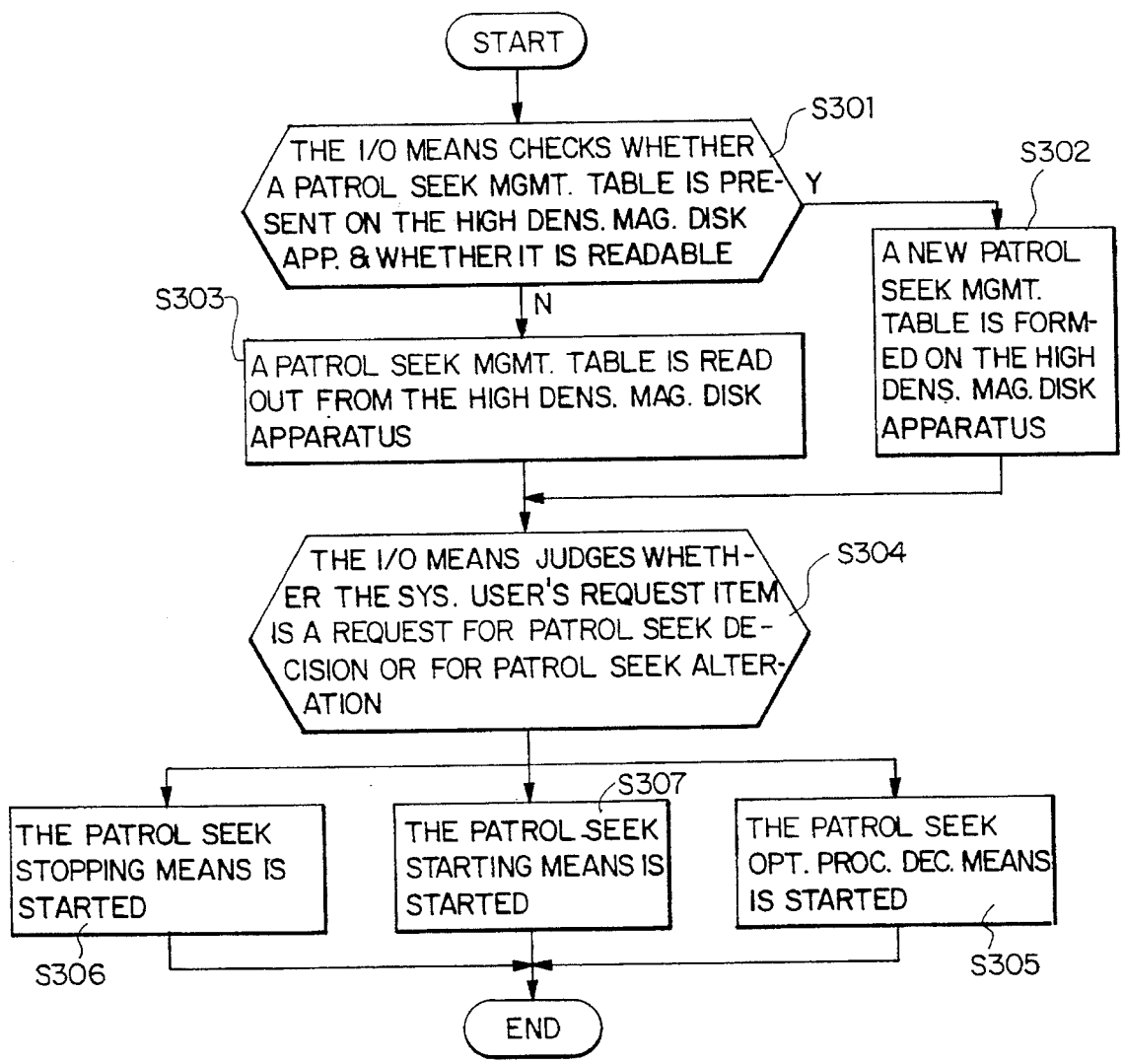
FIG. 5 is a flow chart showing the operation of the I/O means 3 of FIG. 1.

Then, the I/O means 3 checks whether a patrol seek management table 4 is present on some of the magnetic disk media of the high density magnetic disk apparatuses 10 and, if present, whether it is readable (FIG. 5, step S301).

At this time, if no patrol seek management table 4 is present on some of the magnetic disk media of the high density magnetic disk apparatuses 10, or if any one is present and unreadable, a new patrol seek management table 4 is formed on those magnetic disk media of the high density magnetic disk apparatuses 10 in accordance with an instruction from the terminal 1 (FIG. 5, step S302).

If a patrol seek management table 4 is present on some of the magnetic disk media of the high density magnetic disk apparatuses 10, and is readable, the patrol seek management table 4 is read out from those magnetic disk media of the high density magnetic disk apparatuses 10 (FIG. 5, step S303).

Then, the I/O means 3 judges whether the system user's request sent from the terminal 1 is a request for patrol seek decision or a request for patrol seek alteration, or a request for patrol seek start (FIG. 5, step 304).

Here, if the request item from the terminal 1 is judged to be a request for patrol seek decision, the processing is completed by ending the operation of the I/O means 3 and starting the patrol seek optimal processing decision means 7 (FIG. 5, step S305).

Or, if the request item from the terminal 1 is judged to be a request for patrol seek alteration, the processing is completed by starting the patrol seek stopping means 5 (FIG. 5, step S306).

Or, if the request item from the terminal 1 is judged to be a patrol seek start request, the processing is completed by starting the patrol seek starting means 6 (FIG. 5, step S307).

Figure 6:
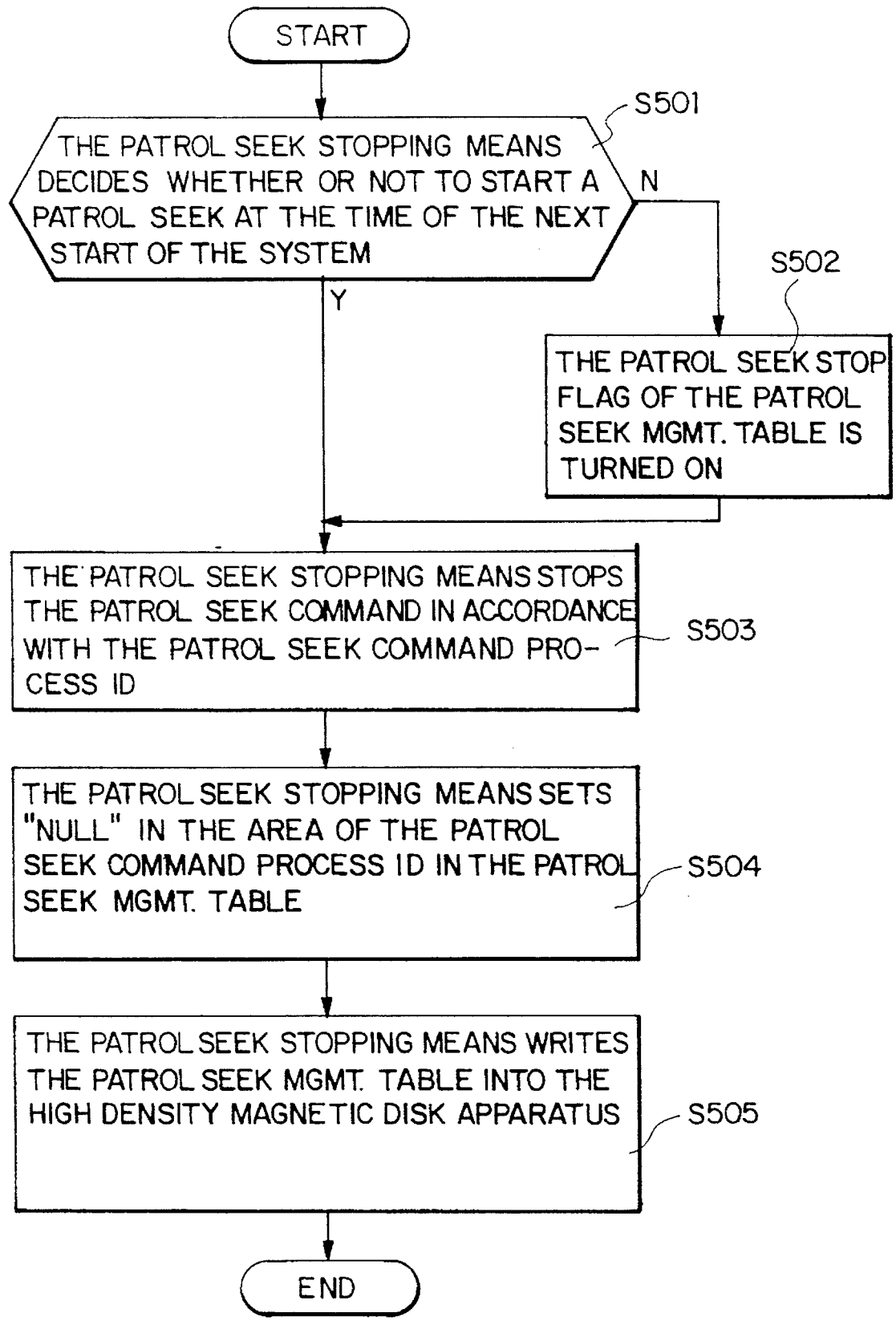
FIG. 6 is a flow chart showing the operation of the patrol seek stopping means 5 of FIG. 1.

The patrol seek stopping means 5, upon actuation in response to an instruction from the I/O means 3, decides whether or not to start a patrol seek at the time of the next start of the system (FIG. 6, step S501).

If it is decided here not to start any patrol seek upon the next start of the system, the patrol seek stop flag 43 of the patrol seek management table 4, read out by the I/O means 3, is turned ON (FIG. 6, step S502).

Then, the patrol seek stopping means 5 stops the patrol seek in accordance with the patrol seek command process ID 41 of the patrol seek management table 4 (FIG. 6, step S503).

The patrol seek stopping means 5 further sets "NULL" in the area of the patrol seek command process ID 41 in the patrol seek management table 4 (FIG. 6, step S504).

Finally, the patrol seek stopping means 5 ends its operation by writing the patrol seek management table 4 into some of the magnetic disk media of the high density magnetic disk apparatus 10 (FIG. 6, step S505).

Figure 7:
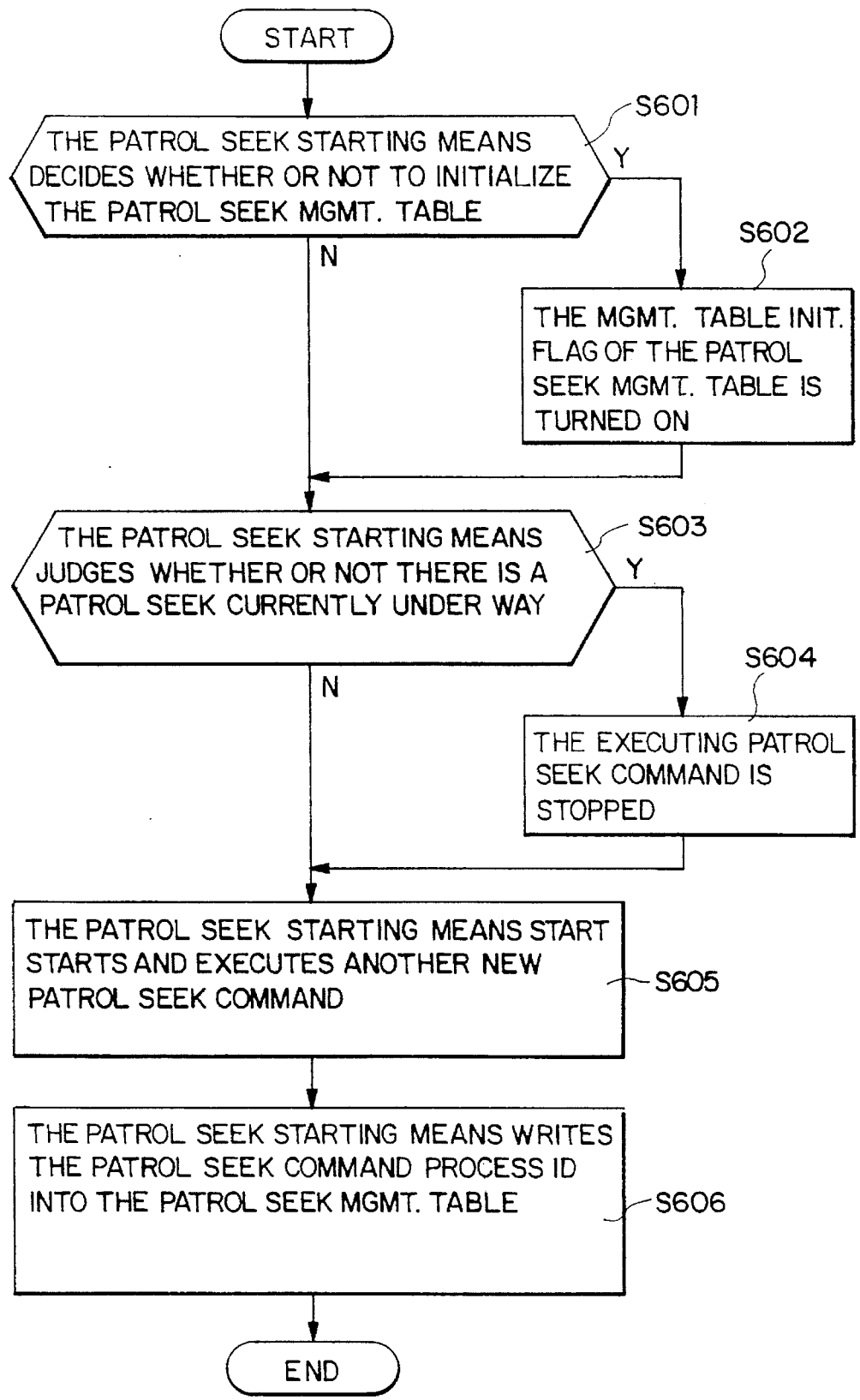
FIG. 7 is a flow chart showing the operation of the patrol seek starting means 6 of FIG. 1.

The patrol seek starting means 6, upon actuation in response to an instruction from the I/O means 3, decides whether or not to initialize the patrol seek management table 4 read out by the I/O means 3 (FIG. 7, step S601).

If it is decided here to initialize the patrol seek management table 4, the management table initialization flag 42 of the patrol seek management table 4, read out by the I/O means 3, is turned ON (FIG. 7, step S602).

Then, the patrol seek starting means 6 judges whether or not there is a patrol seek currently under way (FIG. 7, step S603).

If it is judged here that a patrol seek is currently under way, the patrol seek command that is under way is stopped in accordance with the patrol seek command process ID 41 of the patrol seek management table 4 read out by the I/O means 3 (FIG. 7, step S604).

Next, the patrol seek starting means 6 starts and executes another new patrol seek command (FIG. 7, step S605), registers the ID of this started patrol seek command in the area of the patrol seek command process ID 41 in the patrol seek management table 4 read out by the I/O means 3, and ends its operation by writing the patrol seek management table 4 into some of the magnetic disk media of the high density magnetic disk apparatus 10 (FIG. 7, step S606).

Figure 8:
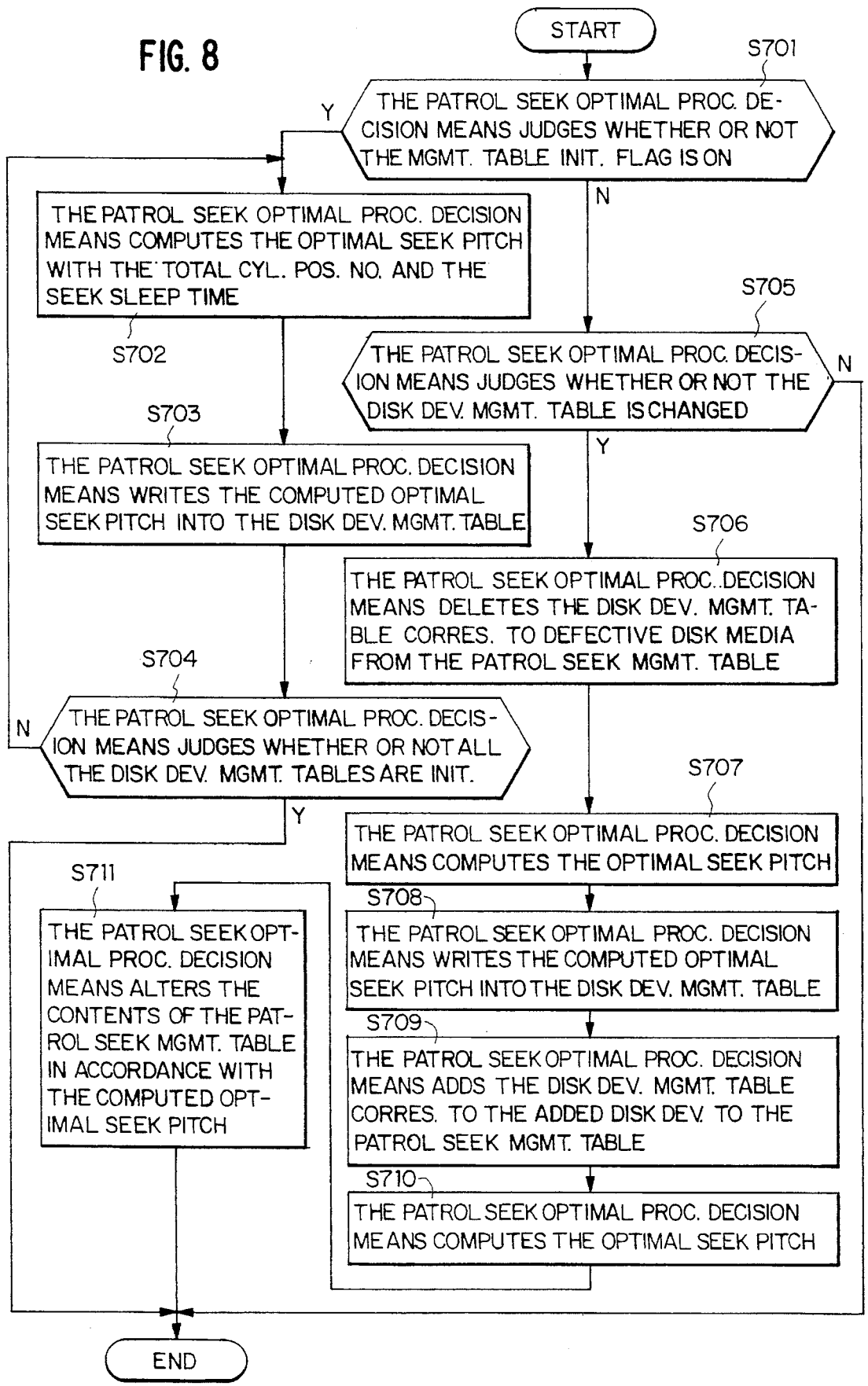
FIG. 8 is a flow chart showing the operation of the patrol seek optimal processing decision means 7 of FIG. 1.

The patrol seek optimal processing decision means 7, upon actuation in response to an instruction from the I/O means 3, judges whether or not the management table initialization flag 42 of the patrol seek management table 4 read out by the I/O means 3 is ON (FIG. 8, step S701).

If it is decided here that the management table initialization flag 42 of the patrol seek management table 4 is ON, the total number of cylinder positions 443 and the seek sleep time 448 are read out of the disk device management table 44 corresponding to the pertinent disk device (a magnetic disk medium packaged into a high density magnetic disk apparatus 10) to compute the optimal seek pitch (FIG. 8, step S702).

Then, the patrol seek optimal processing decision means 7 writes the computed optimal seek pitch into the disk device management table 44 to execute initialization (FIG. 8, step S703).

The patrol seek optimal processing decision means 7 further judges whether or not the disk device management tables 44 corresponding to all the packaged disk devices are initialized (FIG. 8, step S704) and, if it judges they are not, goes back to processing step S702, and its processing ends when all the tables are initialized.

Meanwhile, if the management table initialization flag 41 of the patrol seek management table is judged to be OFF, it is judged whether or not there is any change in any of the disk device management tables 44 of the patrol seek management table 4 (FIG. 8, step S705).

If it is judged at this time that there is no change in any of the disk device management tables 44, the processing is ended. If there is a change in any of the disk device management tables 44, the disk device management table 44 corresponding to the disk device that cannot be opened (probably due to defective disk medium) is deleted from the patrol seek management table 4 (FIG. 8, step S706).

Then, the patrol seek optimal processing decision means 7, in order to set the optimal information in an additional disk device newly packaged into a high density magnetic disk apparatus 10, computes the optimal seek pitch from the total number of cylinder positions 443 and the seek sleep time 448 (FIG. 8, step S707), writes the computed optimal seek pitch into the disk device management table 44 (FIG. 8, step S708), and adds the newly created disk device management table to the patrol seek management table 4 as information corresponding to the added disk device (FIG. 8, step S709).

Further the patrol seek optimal processing decision means 7, if there is any change in any existing disk device management table 44, similarly computes the optimal seek pitch from the total cylinder position number 443 and the seek sleep time 448 (FIG. 8, step S7 10), and ends the processing by altering the contents of the patrol seek management table 4 in accordance with this information (FIG. 8, step S711).

The seek processing means 8 is provided with a file write counter 81 to accept only one of every three write requests because requests to write data too frequently into the high density magnetic disk apparatuses 10 would adversely affect the overall performance of the system.

Figure 9:
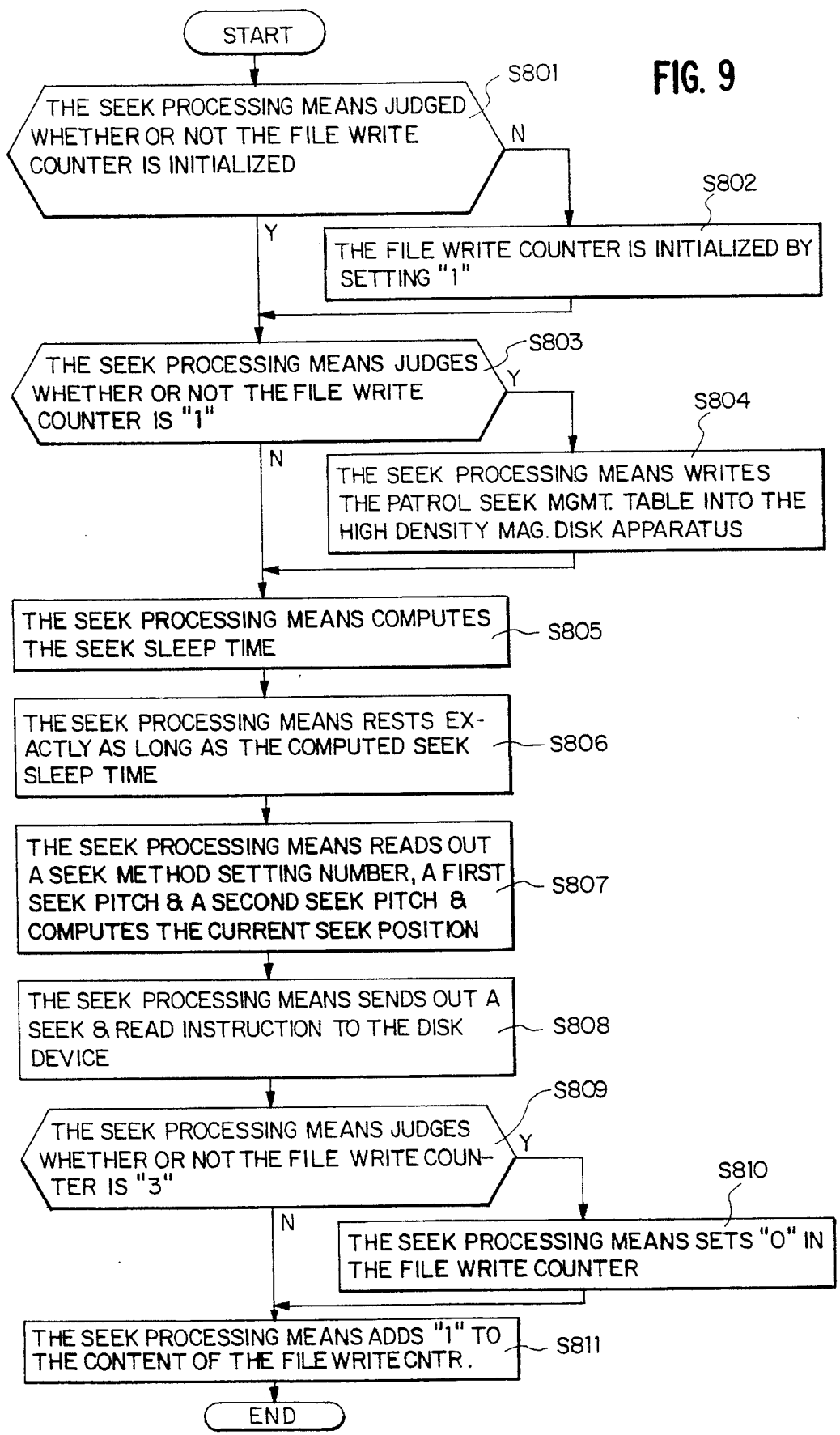
FIG. 9 is a flow chart showing the operation of the seek processing means 8 of FIG. 1.

The seek processing means 8, upon actuation in response to instructions from the patrol seek stopping means 5, the patrol seek starting means 6 and the patrol seek optimal processing decision means 7, first judges whether or not the file write counter 81 is initialized (FIG. 9, step S801).

If it is judged at this time that the file write counter 81 is not initialized, the file write counter 81 is initialized by setting it to "1" (FIG. 9, step S802).

Then, the seek processing means judges whether or not the content of the file write counter 81 is "1" (FIG. 9, step S803) and, if the content of the file write counter 81 is judged to be "1", the patrol seek management table 4 is written onto the magnetic disk medium of the prescribed high density magnetic disk apparatus 10 (FIG. 9, step S804).

Next, the seek processing means 8 computes the seek sleep time (FIG. 9, step S805), and rests exactly as long as the computed seek sleep time (FIG. 9, step S806).

The seek processing means 8 further reads out information including a seek method setting number 444, a first seek pitch and a second seek pitch out of the disk device management table 44 corresponding to the disk device to be sought to compute the current seek position (FIG. 9, step S807).

Next, the seek processing means 8 sends out a seek instruction and a read instruction to the disk device to be sought (FIG. 9, step S808).

Then the seek processing means 8 judges whether or not the content of the file write counter 81 is "3" (FIG. 9, step S809) and, if the content of the file write counter 81 is judged to be "3", sets "0" in the file write counter 81 (FIG. 9, step S810) or, if the content of the file write counter is judged not to be "3", adds 1 to the content of the file write counter 81. It ends the processing by starting again the patrol seek optimal processing decision means 7 (FIG. 9, step S811).

Figure 10:
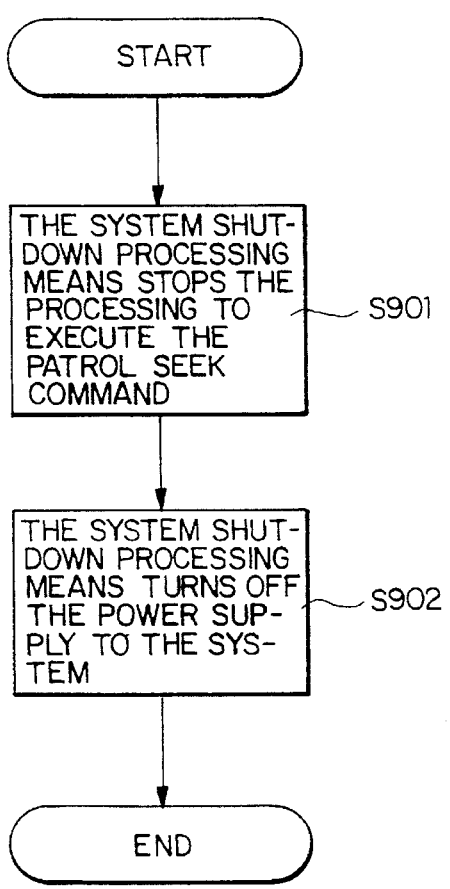
FIG. 10 is a flow chart showing the operation of the system shutdown processing means 9 of FIG. 1.

Finally, the system shutdown processing means 9 stops the processing to execute the patrol seek command in response to an instruction from the terminal 1 (FIG. 10, step S901), and turns off the power supply to the system in compliance with a system shutdown request from the terminal 1 to complete the series of processings (FIG. 10, step S902).

Therefore, in the first preferred embodiment of the present invention, it is possible to register a disk device management table corresponding to each magnetic disk medium in each high density magnetic disk apparatus in the patrol seek management table, and to execute a patrol seek by the optimal method on each magnetic disk medium of each high density magnetic disk apparatus on the basis of this patrol seek management table.

Further, by managing information with the patrol seek management table, the system user is enabled, when using the system, to alter the patrol seek method according to the accessibility of each disk device of each high density magnetic disk apparatus.

Next will be described a second preferred embodiment of the invention.

Figure 11:
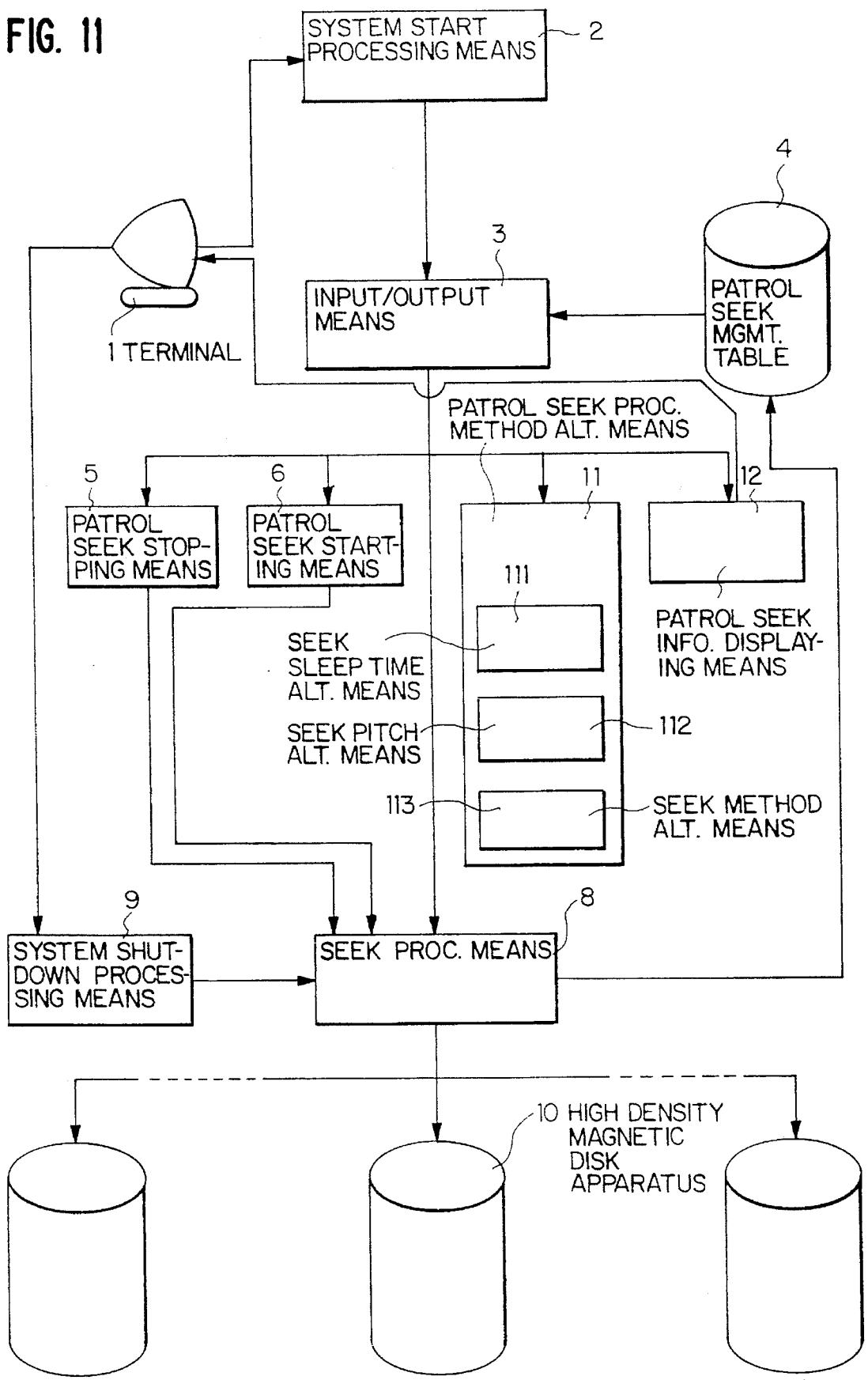
FIG. 11 is a block diagram of a second preferred embodiment of the invention.

Referring to FIG. 2 and FIG. 11, the second preferred embodiment of the invention lacks the patrol seek optimal processing decision means 7 among the constituent elements of the above-described first embodiment, and instead is provided with patrol seek processing method altering means 11. If a patrol seek method altering request received from the terminal 1 is judged to be a processing method altering request as a result of analysis by the I/O means 3, then the patrol seek processing method altering means 11 instructs the seek processing means 8 to alter the patrol seek processing means in accordance with the request item. Furthermore, the patrol seek information displaying means 12 is included for displaying, if a patrol seek method altering request received from the terminal 1 is judged to be an information displaying request as a result of analysis by the I/O means 3, to display patrol seek information stored in the patrol seek management table 4 in accordance with the request item.

Next will be described the operation of the second embodiment with reference to FIGS. 11 through 18.

The patrol seek processing method altering means 11 has a seek sleep time altering means 111 for altering the seek sleep time 448 of disk device management tables 44 in the patrol seek management table 4 stored on some magnetic disk media of the high density magnetic disk apparatuses 10; a seek pitch altering means 112 for altering the seek pitches (a first seek pitch 445 and a second seek pitch 446) of disk device management tables 44 in the patrol seek management table 4 stored on some magnetic disk media of the high density magnetic disk apparatuses 10; and seek method altering means 113 for altering the seek method (seek method setting number 444) of disk device management tables 44 in the patrol seek management table 4 stored on some magnetic disk media of the high density magnetic disk apparatuses 10.

Figure 12:
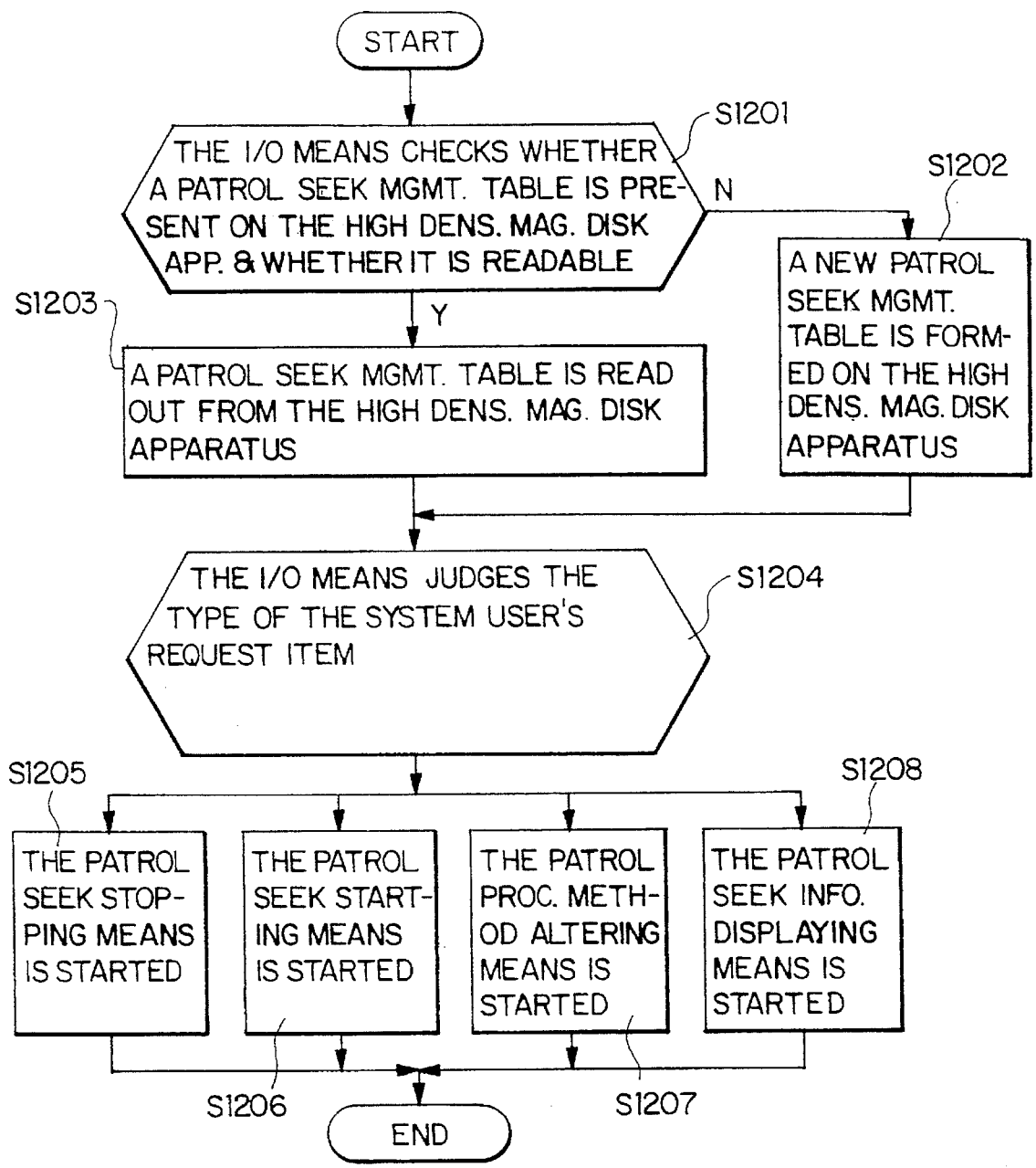
FIG. 12 is a flow chart showing the operation of the I/O means 3 of FIG. 11.

The I/O means 3 checks whether a patrol seek management table 4 is present on some of the magnetic disk media of the high density magnetic disk apparatuses 10 and, if present, whether it is readable (FIG. 12, step S1201).

At this time, if no patrol seek management table 4 is present on some of the magnetic disk media of the high density magnetic disk apparatuses 10, or if any one present is unreadable, a new patrol seek management table 4 is formed on those magnetic disk media of the high density magnetic disk apparatuses 10 in accordance with an instruction from the terminal 1 (FIG. 12, step S1202).

Or, if a patrol seek management table 4 is present on some of the magnetic disk media of the high density magnetic disk apparatuses 10, and is readable, the patrol seek management table 4 is read out from those magnetic disk media of the high density magnetic disk apparatuses 10 (FIG. 12, step S1203).

Then, the I/O means 3 judges the type of the system user's request item sent from the terminal 1 (FIG. 12, step 1204).

Here, if the request item from the terminal 1 is judged to be a request for patrol seek stop, the processing is ended by starting the patrol seek stopping means 5 (FIG. 12, step S1205).

If the request item from the terminal 1 is judged to be a request for patrol seek start, the processing is ended by starting the patrol seek starting means 6 (FIG. 12, step S1206).

If the request item from the terminal 1 is judged to be a request for patrol seek alteration, the processing is ended by starting the patrol seek processing method altering means 11 (FIG. 12, step S1207).

If the request item from the terminal 1 is judged to be a patrol information displaying request, the processing is completed by starting the patrol seek information displaying means 12 (FIG. 12, step S1208).

Figure 13:
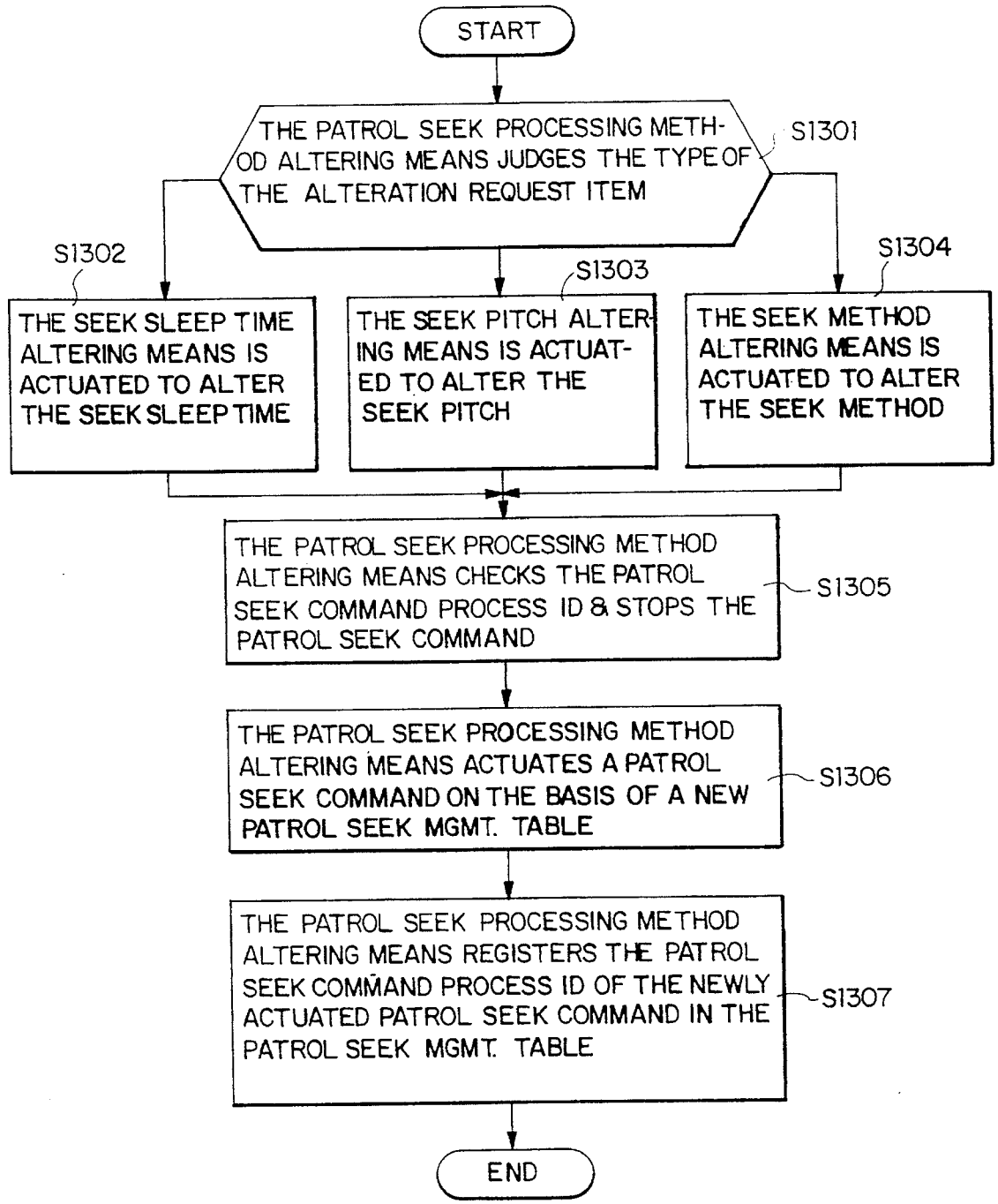
FIG. 13 is a flow chart showing the operation of the patrol seek processing method altering means 11 of FIG. 11.

The patrol seek processing method altering means 11 judges the type of the alteration request item from the system user, sent from the terminal 1 (FIG. 13, step S1301).

If, at this time, the alteration request item concerns the seek sleep time, the seek sleep time altering means 111 is actuated to alter the seek sleep time (FIG. 13, step S1302); if the alteration request item concerns the seek pitch, the seek pitch altering means 112 is actuated to alter the seek pitches (FIG. 13, step S1303); or if the alteration request item concerns the seek method, the seek method altering means 113 is actuated to alter the seek method (FIG. 13, step S1304).

Then the patrol seek processing method altering means 11 checks the patrol seek command process ID 41 in the patrol seek management table 4 stored on some of the magnetic disk media of the high density magnetic disk apparatuses 10, and stops the patrol seek command currently under way (FIG. 13, step S1305).

The patrol seek processing method altering means 11 also actuates a patrol seek command on the basis of the patrol seek information contained within the patrol seek management table 4 and altered by either the seek slip time altering means 111, the seek pitch altering means 112, or the seek method altering means 113 (FIG. 13, step S1306).

Finally, the patrol seek processing method altering means 11 completes the processing by registering the process ID of the newly actuated patrol seek command in the area of the patrol seek command process ID 41 of the patrol seek management table 4 (FIG. 13, step S1307).

Figure 14:
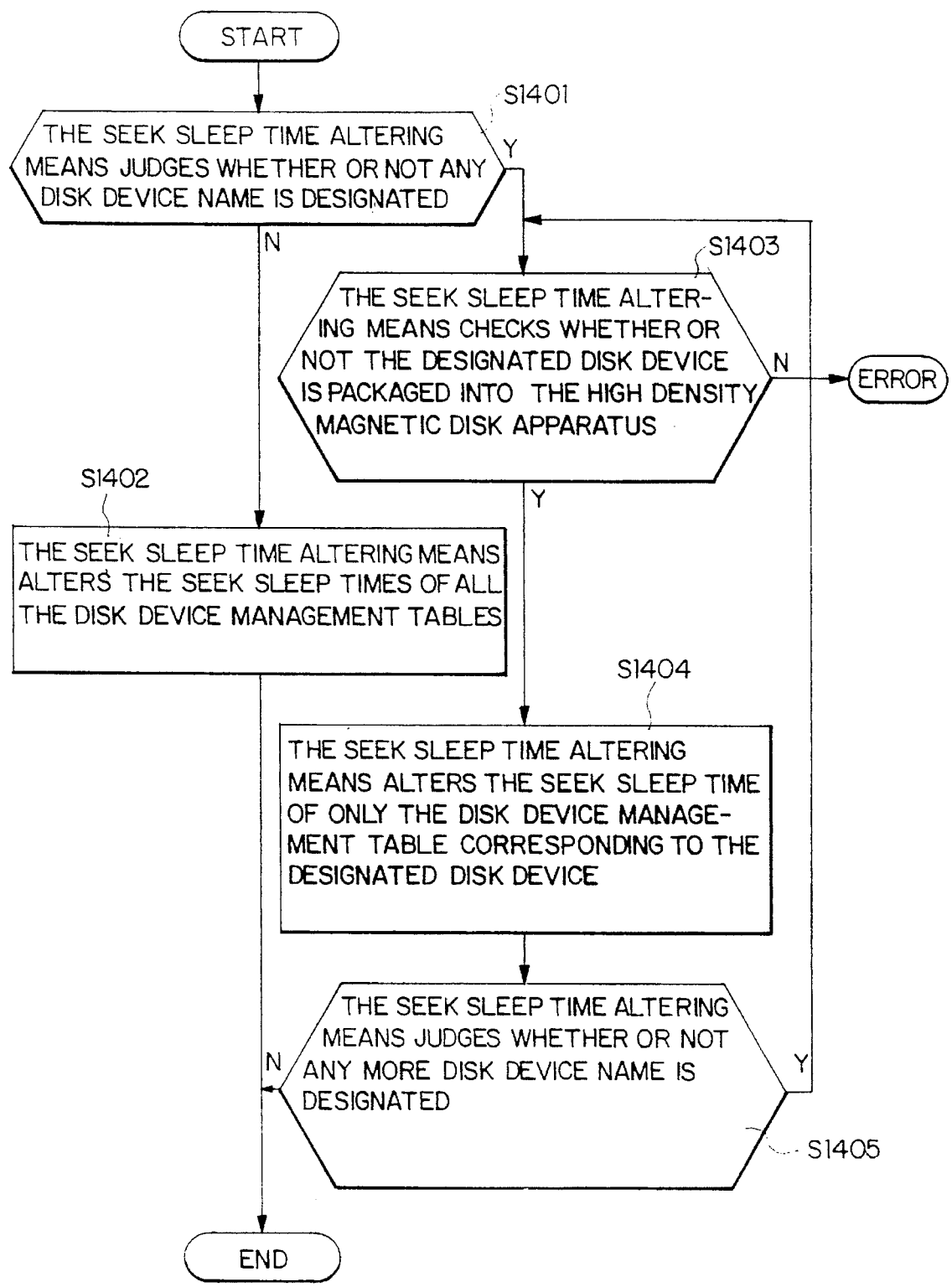
FIG. 14 is a flow chart showing the operation of the seek sleep time altering means 111 of FIG. 11.

When activated seek sleep time altering means 111 judges whether or not a disk device name is designated (FIG. 14, step S1401) and, if no disk device name is designated, ends the processing by altering the seek sleep times 448 of the disk device management tables 44 corresponding to all the disk devices packaged into the high density magnetic disk apparatuses 10 (FIG. 14, step S1402).

On the other hand, if any disk device is designated, the seek sleep time altering means 111 checks whether or not the designated disk device is packaged into any high density magnetic disk apparatus 10 (FIG. 14, step S1403).

At this time, if the designated disk device is not packaged, the processing will end by error, or if it is packaged, the seek sleep time 448 of the disk device management table 44, corresponding to the designated disk device, of the patrol seek management table 4 is altered (FIG. 14, step S1404).

Then, the seek sleep time altering means 111 judges whether or not any more disk device names are designated and if none are designated, ends the processing, or if any name is designated, returns to processing step S1403 (FIG. 14, step 1405).

Figure 15:
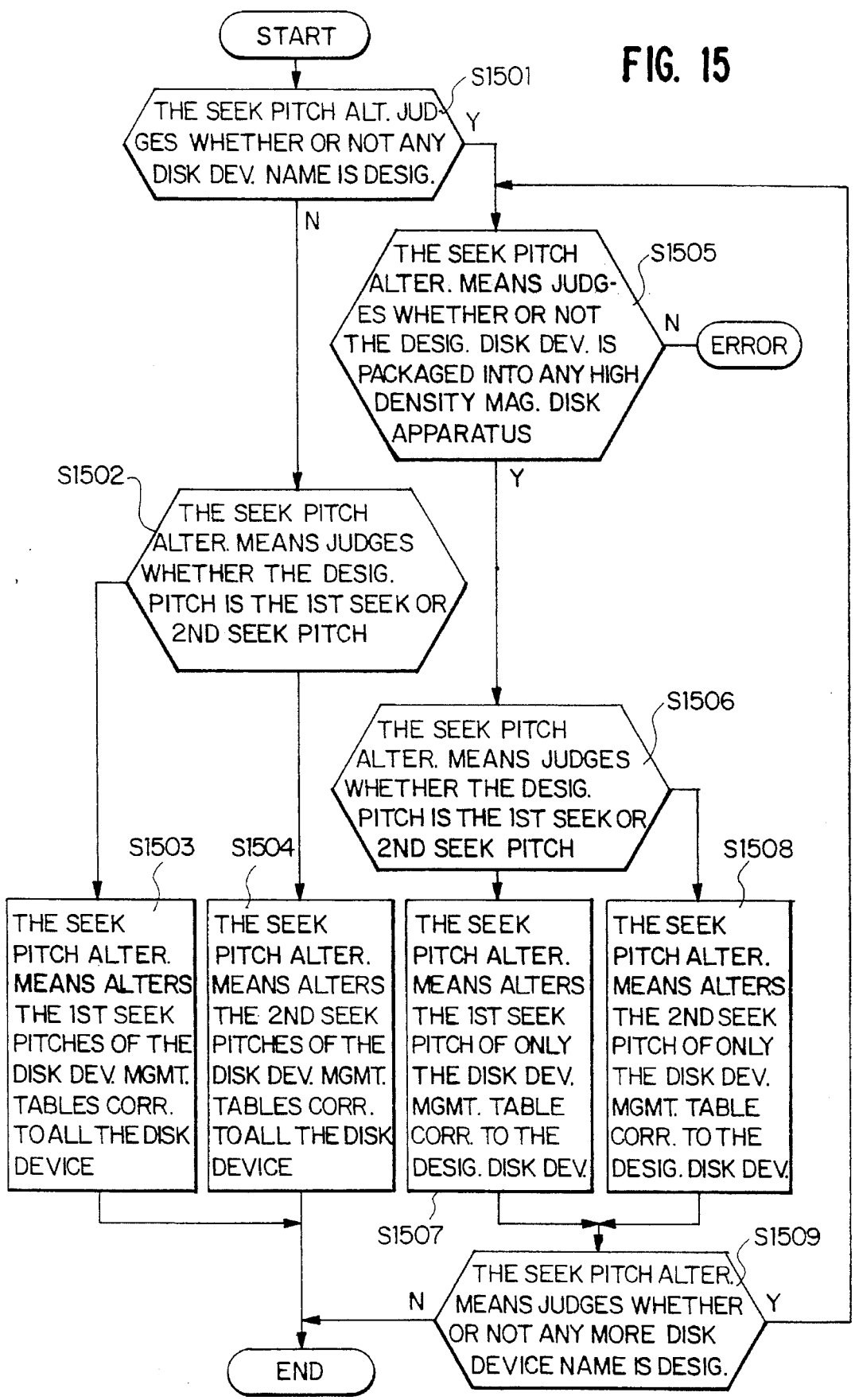
FIG. 15 is a flow chart showing the operation of the seek pitch altering means 112 of FIG. 11.

When activated, the seek pitch altering means 112 first judges whether or not any disk device name is designated (FIG. 15, step S1501).

If, at this time, it judges that no disk device name is designated, it judges whether the pitch whose alteration is designated is the first seek pitch 445 or the second seek pitch 446 (FIG. 15, step S1502).

If the alteration-designated pitch is judged to be the first seek pitch 445 here, the processing is ended by altering the first seek pitches 445 for the disk device management tables 44 corresponding to all the disk devices (FIG. 15, step S1503).

Or, if the alteration-designated pitch is judged to be the second seek pitch 446, the processing is ended by altering the second seek pitches 446 for the disk device management tables 44 corresponding to all the disk devices (FIG. 15, step S1504).

On the other hand, if it is judged that any disk device name is designated, it is judged whether or not the designated disk device is packaged into any high density magnetic disk apparatus 10 (FIG. 15, step S1505) and, if it is judged that the designated disk device is not packaged, the processing will end by error, or if it is judged to be packaged, it is judged whether the pitch whose alteration is designated is the first seek pitch 445 or the second seek pitch 446 (FIG. 15, step S1506).

If the alteration-designated pitch is judged to be the first seek pitch 445, the first seek pitch 445 for only the disk device management table 44 corresponding to the designated disk device is altered (FIG. 15, step S1507).

Or, if the alteration-designated pitch is judged to be the second seek pitch 446, the second seek pitch 446 for only the disk device management table 44 corresponding to the designated disk device is altered (FIG. 15, step S1508). Then, the seek pitch altering means 112 judges whether or not any more disk device names are designated and if not are designated, ends the processing, or if any name is designated, returns to processing steps S1505 (FIG. 15, step S1509).

Figure 16:
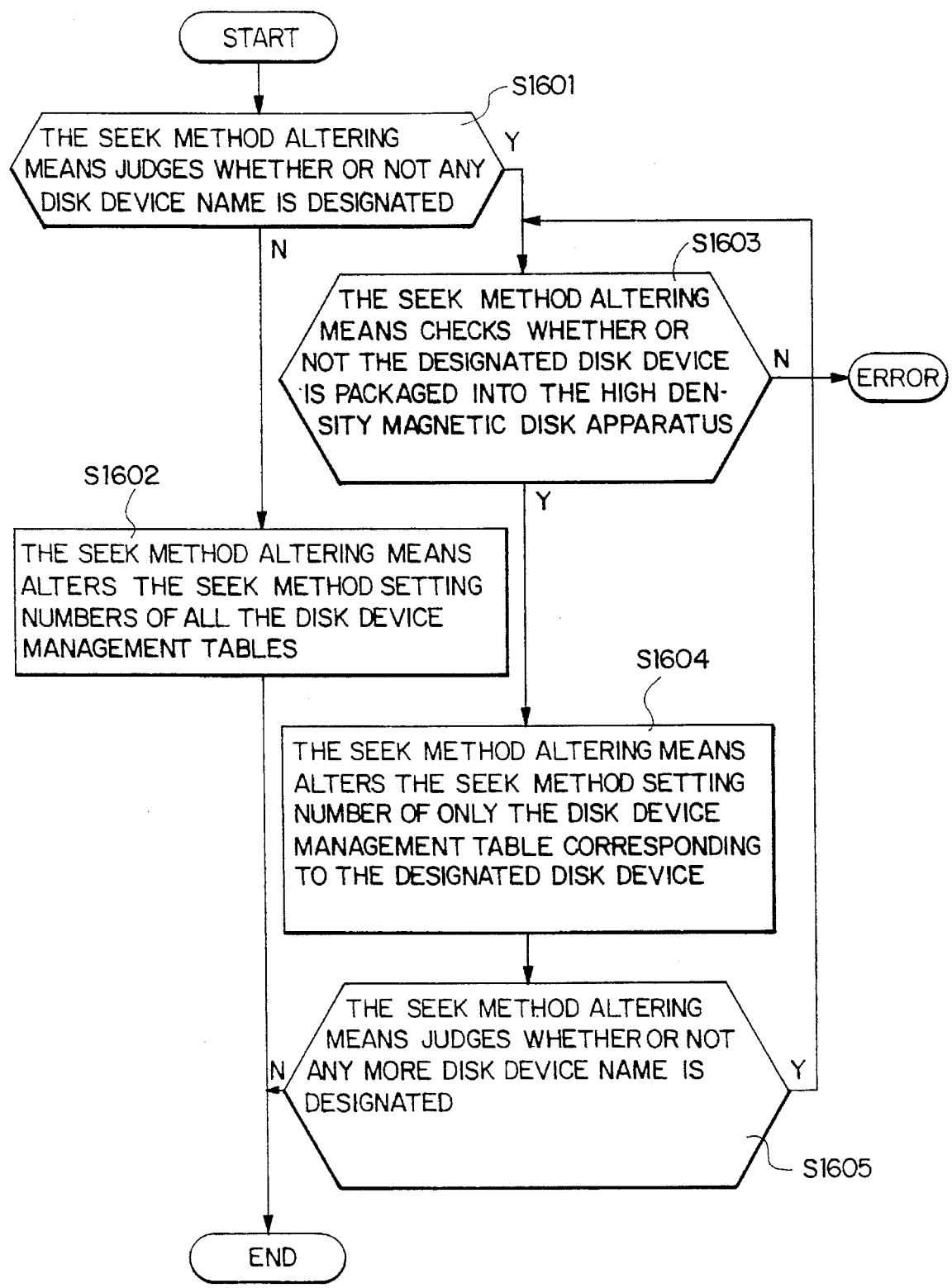
FIG. 16 is a flow chart showing the operation of the seek method method altering means 113 of FIG. 11.

The seek method altering means 113 first judges whether or not any disk device name is designated (FIG. 16, step S1601).

If, at this time, it judges that no disk device name is designated, it ends the processing by altering the seek method setting numbers 444 for the disk device management tables 44 corresponding to all the disk devices (FIG. 16, step S1602).

Or, if it is judged that any disk device name is designated, it is judged whether or not the designated disk device is packaged into any high density magnetic disk apparatus 10 (FIG. 16, step S1603) and, if it is judged that the designated disk device is not packaged, the processing will end by error, or if it is judged that the designated disk device is packaged, the seek method setting number 444 for only the disk device management table 44 corresponding to the designated disk device is altered (FIG. 16, step S1604).

Then, the seek method altering means 113 judges whether or not any more disk device names are designated and, if none are designated, ends the processing, or if any name is designated, returns to processing step S1603 (FIG. 16, step S1605).

Figure 18:
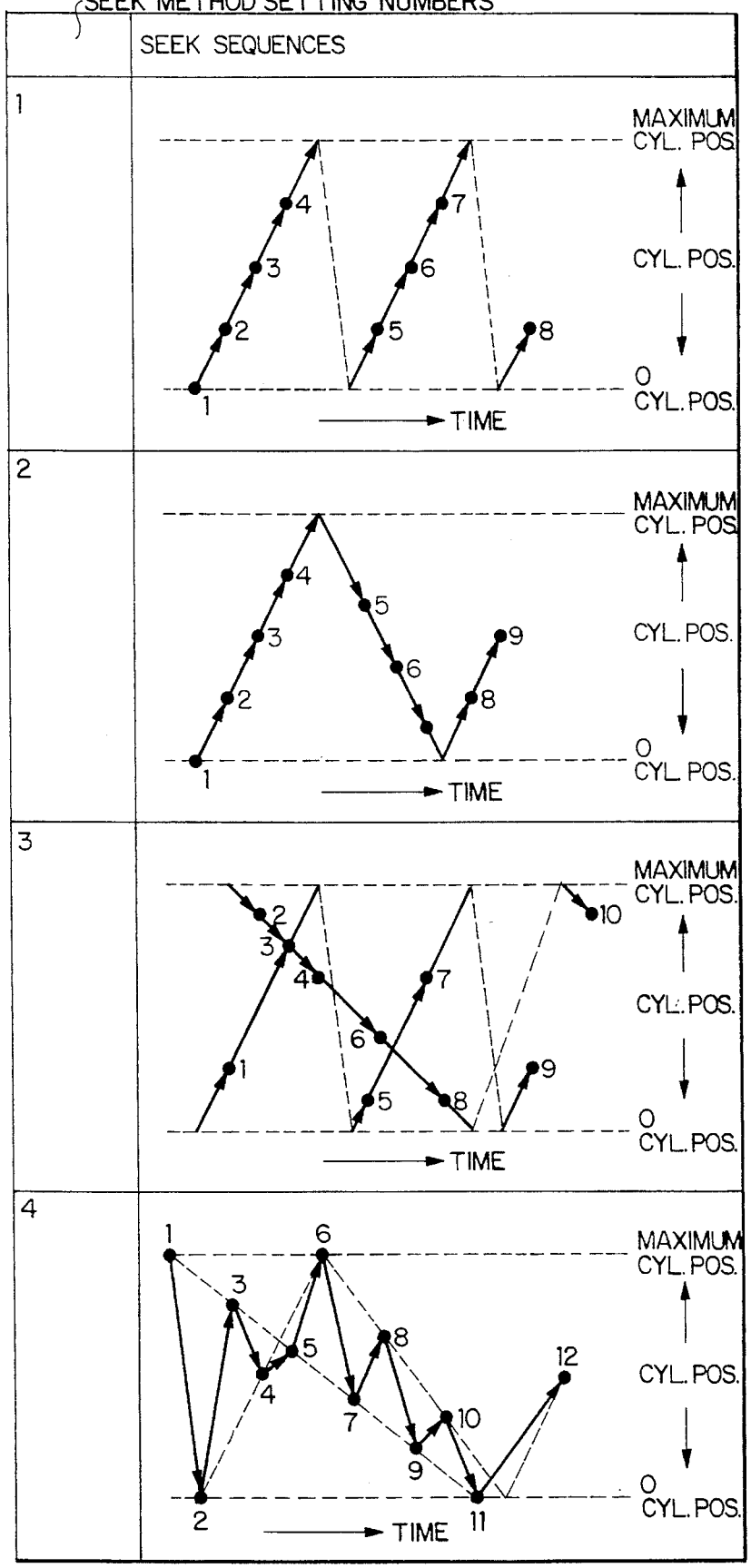
FIG. 18 is an illustrative diagram showing the seek sequences for cylinder positions corresponding to seek method setting numbers in the disk device management table 44 of FIG. 3.

Here, FIG. 18 is an illustrative diagram showing seek sequences corresponding to seek method setting numbers. When actuating the seek method altering means 113, the system user can execute one of several patrol seek methods listed in FIG. 18 by selecting the corresponding seek method setting number.

Seek method setting No. 1, for instance, represents a case in which a seek operation takes place from the inside (the 0 cylinder position) toward the outside (the maximum cylinder position) of the magnetic disk medium at the first seek pitch 445 of the pertinent disk device management table 44 of the patrol seek management table 4.

Similarly, seek method setting No. 2 represents a case in which a seek operation from the inside (the 0 cylinder position) toward the outside (the maximum cylinder position) of the magnetic disk medium at the first seek pitch 445 of the pertinent disk device management table 44 of the patrol seek management table 4 is followed by a seek operation from the outside (the maximum cylinder position) toward the inside (the 0 cylinder position).

Seek method setting No. 3 represents the combination of a pattern in which a seek operation takes place from the inside (the 0 cylinder position) toward the outside (the maximum cylinder position) of the magnetic disk medium at the first seek pitch 445 of the pertinent disk device management table 44 of the patrol seek management table 4 and of another pattern in which a seek operation takes place from the outside (the maximum cylinder position) toward the inside (the 0 cylinder position) of the disk device at the second seek pitch 446 of the pertinent disk device management table 44 of the patrol seek management table 4.

Further, seek method setting No. 4 represents the combination of a pattern in which a seek operation from the inside (the 0 cylinder position) toward the outside (the maximum cylinder position) of the magnetic disk medium at the first seek pitch 445 of the pertinent disk device management table 44 of the patrol seek management table 4 is followed by a seek operation from the outside (the maximum cylinder position) toward the inside (the 0 cylinder position) and of another pattern in which a seek operation from the outside (the maximum cylinder position) toward the inside (the 0 cylinder position) of the magnetic disk medium at the second seek pitch 446 of the pertinent disk device management table 44 of the patrol seek management table 4 is followed by a seek operation from the inside (the 0 cylinder position) toward the outside (the maximum cylinder position) at the second seek pitch 446 of the pertinent disk device management table 44 of the patrol seek management table 4.

Figure 17:
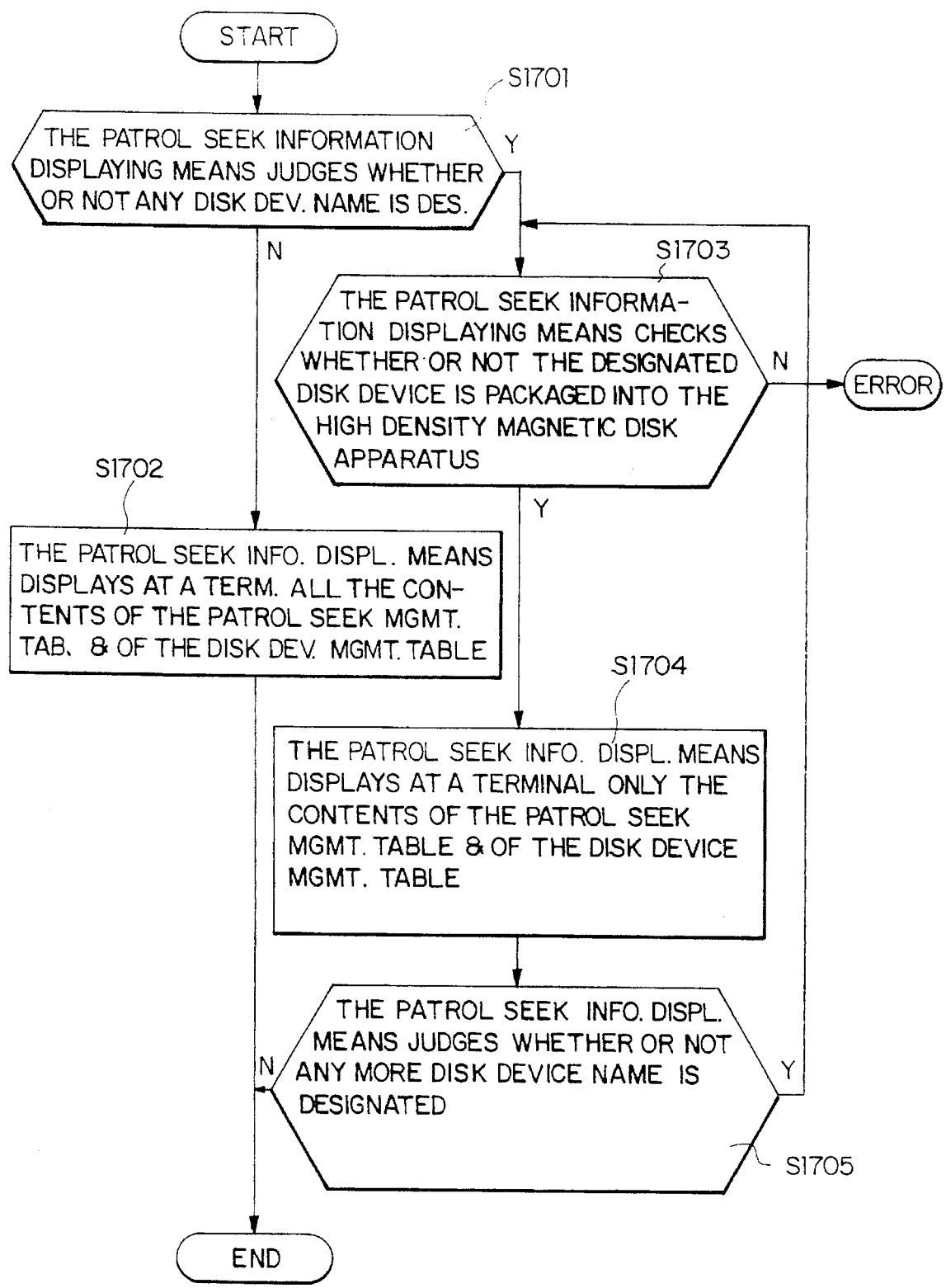
FIG. 17 is a flow chart showing the operation of the patrol seek information displaying means 12 of FIG. 11.

The patrol seek information displaying means 12 is actuated when the I/O means 3 judges a request item from the terminal 1 to be a patrol seek information displaying request, and first judges whether or not any disk device name is designated (FIG. 17, step S1701).

If, at this time, it judges that no disk device name is designated, it ends the processing by displaying at the terminal 1 all the contents of the patrol seek management table 4 and of the disk device management tables 44 (FIG. 17, step S1702).

Or, if it is judged that any disk device name is designated, it is judged whether or not the designated disk device is packaged into any high density magnetic disk apparatus 10 (FIG. 17, step S1703) and, if it is judged that the designated disk device is not packaged, the processing will end by error, or if it is judged that the designated disk device is packaged, only those contents of the patrol seek management table 4 and the disk device management table 44 corresponding to the designated disk device are displayed at the terminal 1 (FIG. 17, step S1704).

Then, the patrol seek information displaying means 12 judges whether or not any more disk device names are designated and, if none are designated, ends the processing or, if any name designated, returns to processing step S1703 (FIG. 17, step S1705).

Therefore, the second preferred embodiment of the present invention provides similar effects to those of the above-described first embodiment and, moreover, performs a patrol seek by the optimal method for each high density magnetic disk apparatus, so that it can serve to improve the reliability of the high density magnetic disk apparatuses and to maintain the stability of the head disk assemblies (HDA's) for a long period.

Furthermore, by allowing the system user to alter the patrol seek method according to the access frequency of each high density magnetic disk apparatus, the deterioration of the overall performance of the system can be restrained to the necessary minimum, and the reliability and stability of magnetic disk media can be enhanced.

While the present invention has been described with reference to the preferred embodiments thereof, it will now be possible for persons skilled in the art to put this invention into practice in various other manners.

What is claimed is:

1. A patrol seek controller for controlling a patrol seek operation on a plurality of magnetic disk apparatuses each of which includes one or more magnetic disks, based on one of a plurality of patrol seek information sequences selected by a user, wherein each of the patrol seek information sequences defines an order in which tracks of at least one of the magnetic disks are searched based on a performance characteristic of the magnetic disk, the patrol seek controller comprising:

a patrol seek management table for storing the patrol seek information sequences including a plurality of patrol seek patterns corresponding to each of the magnetic disk apparatuses;

seek means for executing a seek operation on the plurality of magnetic disk apparatuses on the basis of said patrol seek management table in response to a patrol seek executing signal, and stopping said seek operation in response to a patrol seek stopping signal; and input/output means for receiving a patrol seek instruction which includes a disk device name which identifies one of the magnetic disk apparatuses from a terminal connected to the patrol seek controller, checking whether or not a patrol seek information sequence corresponding to said disk device name exists in said patrol seek management table, analyzing the patrol seek instruction if the patrol seek information sequence exists, and based on the analysis performing one of sending said patrol seek stopping signal with said disk device name to said seek means and sending said patrol seek executing signal with said disk device name indicated to said seek means.

2. A patrol seek controller, as claimed in claim 1, wherein said seek means comprises:

counter means for limiting execution of data write requests to the magnetic disk apparatuses, and permitting execution of data write requests when a certain number of said data write requests have been made.

3. A patrol seek controller, as claimed in claim 1, wherein said patrol seek management table comprises;

disk device management tables, corresponding to a plurality of magnetic disk devices included in the magnetic disk apparatuses, for storing the patrol seek information sequences;

patrol seek process identification information for identifying a process executing said patrol seek operation;

first flag information indicating whether or not to initialize any of said disk device management tables;

second flag information indicating whether or not to perform said patrol seek operation at the time of a next start-up of the patrol seek controller.

4. A patrol seek controller, as claimed in claim 3, wherein each of said disk device management tables is comprised of:

a disk device name;

a total number of cylinder positions of said disk device;

a seek pattern setting number representing an access order of cylinder positions of said disk device;

a pitch of said seek operation for said disk device being one of a direction corresponding to an outermost cylinder (the maximum cylinder position) toward an innermost cylinder (the 0 cylinder position) and a direction corresponding to the innermost cylinder toward the outermost cylinder;

a cylinder position on which to perform said seek operation; and a value indicating a period of sleep time, wherein said period of sleep time indicates the amount of time during which said seek operation is to be suspended.

5. A patrol seek controller for controlling a patrol seek operation on a plurality of magnetic disk apparatuses each of which includes one or more magnetic disks, based on one of a plurality of patrol seek information sequences selected by a user, wherein each of the patrol seek information sequences defines an order in which tracks of at least one of said magnetic disks are searched based on a performance characteristic of the magnetic disk, the patrol seek controller comprising:

a patrol seek management table for storing the patrol seek information sequences including a plurality of patrol' seek patterns corresponding to each of the magnetic disk apparatuses;

seek means for executing a seek operation on the plurality of magnetic disk apparatuses based on said patrol seek management table in response to a patrol seek executing signal, and stopping said seek operation in response to a patrol seek stopping signal; and input/output means for receiving a patrol seek instruction which includes a disk device name which identifies one of the magnetic disk apparatuses, from a terminal connected to the patrol seek controller, reading, in response to said patrol seek instruction, said patrol seek management table in order, checking whether or not a patrol seek information sequence corresponding to said disk device name exists in said patrol seek management table, analyzing the patrol seek instruction if the patrol seek information sequence exists, and based on the analysis performing one of sending a patrol seek stopping signal with said disk device name to said seek means if the analyzed request is to stop said patrol seek operation, sending a patrol seek executing signal with said disk device name indicated to said seek means if the analyzed request is to start said patrol seek operation, altering a patrol seek pattern of said patrol seek management table if the analyzed request is to alter the patrol seek and indicating the information corresponding to said altered patrol seek management table to said seek means, and displaying the patrol seek information stored in said patrol management table onto said terminal if the analyzed request is to display the patrol seek information.

6. A patrol seek controller, as claimed in claim 5, wherein said seek means comprises:

counter means for limiting execution of data write requests to the magnetic disk apparatuses, and permitting execution of data write requests when a certain number of said data write requests have been made.

7. A patrol seek controller, as claimed in claim 5, wherein said patrol seek management table comprises:

disk device management tables, corresponding to a plurality of magnetic disk devices included in said magnetic disk apparatuses, for storing the patrol seek information sequences;

patrol seek process identification information for identifying a process executing said patrol seek operation;

first flag information indicating whether or not to initialize any of said disk device management tables;

second flag information indicating whether or not to perform said patrol seek operation at the time of a next start-up of the patrol seek controller.

8. A patrol seek controller, as claimed in claim 7, wherein each of said disk device management tables is comprised of:

a disk device name;

a total number of cylinder positions of said disk device;

a seek pattern setting number representing an access order of cylinder positions of said disk device;

a pitch of said seek operation for said disk device being one of a direction corresponding to an outermost cylinder (the maximum cylinder position) toward the innermost cylinder (the 0 cylinder position) and a direction corresponding to the innermost cylinder toward the outermost cylinder;

a cylinder position on which to perform said seek operation; and a value indicating a period of sleep time, wherein said period of sleep time indicates the amount of time during which said seek operation is to be suspended.

9. A patrol seek controller, as claimed in claim 5, wherein said input/output means comprises;

seek sleep time altering means for altering a value corresponding to a period of sleep time;

seek pitch altering means for altering a pitch of said seek operation for said disk device from one of a direction indicating an outermost cylinder (the maximum cylinder position) toward an innermost cylinder (the 0 cylinder position) and a direction indicating the innermost cylinder toward the outermost cylinder; and seek pattern altering means for altering a seek pattern setting number representing an access order of cylinder positions of said disk device.

10. A method for a patrol seek controller controlling a patrol seek operation on a plurality of magnetic disk apparatuses each of which includes one or more magnetic disks, wherein a user selects one of a plurality of patrol seek information sequences each of which defines an order in which tracks of said magnetic disks are searched based on apparatus performance, and wherein a seek means performs seek operations based on the selected patrol information sequence, comprising the steps of:

storing the patrol seek information sequences including a plurality of patrol seek patterns corresponding to each of the magnetic disk apparatuses in a patrol seek management table;

executing a seek operation on the plurality of magnetic disk apparatuses based on said patrol seek management table in response to a patrol seek executing signal;

stopping said seek operation in response to a patrol seek stopping signal;

receiving a patrol seek instruction including a disk device name which identifies one of the magnetic disk apparatuses, from a terminal connected to the patrol seek controller;

checking whether or not a patrol seek information sequence corresponding to said disk device name exists in said patrol seek management table;

analyzing the patrol seek instruction if the patrol seek information sequence exists; and based on the analysis performing one of sending said patrol seek stopping signal with said disk device name to the seek means and sending said patrol seek executing signal with said disk device name indicated to the seek means.

11. A method for a patrol seek controller controlling a patrol seek operation on a plurality of magnetic disk apparatuses each of which includes one or more magnetic disks, wherein a user selects one of a plurality of patrol seek information sequences each of which defines an order in which tracks of said magnetic disks are searched based on apparatus performance, and wherein a seek means performs seek operations based on the selected patrol seek information sequence, comprising the steps of:

storing the patrol seek information sequence including a plurality of patrol seek patterns corresponding to each of the magnetic disk apparatuses in a patrol seek management table;

executing a seek-operation on said plurality of magnetic disk apparatuses based on said patrol seek management table in response to a patrol seek executing signal;

stopping said seek operation in response to a patrol seek stopping signal;

receiving a patrol seek instruction including a disk device name which identifies one of the magnetic disk apparatuses, from a terminal connected to the patrol seek controller;

reading, in response to said patrol seek instruction, said patrol seek management table in order;

checking whether or not a patrol seek information sequence corresponding to said disk device name exists in said patrol seek management table;

analyzing the patrol seek instruction if the patrol seek information sequence exists;

based on the analysis performing one of sending the patrol seek stopping signal with said disk device name to the seek means, sending the patrol seek executing signal with said disk device name indicated to the seek means, altering a patrol seek pattern of said patrol seek management table and indicating the information of said altered patrol seek management table to the seek means, and displaying the patrol seek information stored in said patrol management table onto said terminal when a display of the patrol seek information is requested.

12. A patrol seek controller, as claimed in claim 1, wherein said input output means further comprises:

means for creating a new patrol seek management table on the basis of said patrol seek instruction;

means for determining an optimal patrol seek pattern for a magnetic disk apparatuses added to said plurality of magnetic disk apparatuses; and means for notifying said seek means that the patrol seek information does not exist, wherein a new patrol seek table is created, an optimal patrol seek pattern is determined, and the seek means notified if the patrol seek information does not exist.

13. A patrol seek controller, as claimed in claim 12, wherein said seek means executes the determined optimal patrol seek pattern.

14. A patrol seek controller, as claimed in claim 5, wherein said input output means further comprises:

means for creating a new patrol seek management table on the basis of said patrol seek instruction from said terminal;

means for determining an optimal patrol seek pattern for a magnetic disk apparatuses added to said plurality of magnetic disk apparatuses and indicating to said seek means; and means for notifying said seek means that the patrol seek information does not exist, wherein a new patrol seek table is created, an optimal patrol seek pattern is determined, and the seek means notified if the patrol seek information does not exist.

15. A patrol seek controller, as claimed in claim 14, wherein said seek means executes the determined optimal patrol seek pattern.

16. A method of controlling a patrol seek operation, as claimed in claim 10, wherein if said patrol seek information sequence does not exist, further comprising the steps of:

creating a new patrol seek management table based on said patrol seek instruction;

determining an optimal patrol seek pattern for a magnetic disk apparatus added to said plurality of magnetic disk apparatuses; and indicating to the seek means that the patrol seek information does not exist.

17. A method of controlling a patrol seek operation, as claimed in claim 11, wherein if said patrol seek information sequence does not exist, further comprising the steps of:

creating a new patrol seek management table based on said patrol seek instruction;

determining an optimal patrol seek pattern for a magnetic disk apparatus added to said plurality of magnetic disk apparatuses; and indicating to the seek means that the patrol seek information does not exist.

* * * * *